(12) United States Patent
Tsai et al.

(10) Patent No.: US 8,429,166 B2
(45) Date of Patent: Apr. 23, 2013

(54) DENSITY-BASED DATA CLUSTERING METHOD

(75) Inventors: Cheng-Fa Tsai, Pingtung (TW); Tang-Wei Huang, Pingtung (TW)

(73) Assignee: National Pingtung University of Science & Technology, Neipu Hsiang, Pingtung County (TW)

( * ) Notice: Subject to any disclaimer, the term of this patent is extended or adjusted under 35 U.S.C. 154(b) by 0 days.

(21) Appl. No.: 13/462,460

(22) Filed: May 2, 2012

(65) Prior Publication Data

US 2012/0296905 A1 Nov. 22, 2012

(30) Foreign Application Priority Data

May 17, 2011 (TW) .............................. 100117240 A (51) Int. Cl.
*G06F 7/00* (2006.01)
*G06F 17/30* (2006.01)
*G06F 15/16* (2006.01)

(52) U.S. Cl.
USPC .......................................... 707/737; 707/776

(58) Field of Classification Search .................. 707/737, 707/776
See application file for complete search history.

(56) References Cited

U.S. PATENT DOCUMENTS

| | | | |
|---|---|---|---|
| 5,832,182 | A | 11/1998 | Zhang et al. |
| 6,003,029 | A | 12/1999 | Agrawal et al. |
| 6,549,907 | B1 | 4/2003 | Fayyad et al. |
| 6,640,227 | B1 | 10/2003 | Andreev |

OTHER PUBLICATIONS

Cheng-Fa Tsai and Tang-Wei Huang. QIDBSCAN: A Quick Density-Based Clustering Technique. Proceedings of the 2012 International Symposium on Computer, Consumer and Control (IS3C), IEEE Computer Society, National Chin-Yi University, Taichung, Taiwan, Jun. 4-6, 2012, pp. 638-641.*
Ergun Biçici and Deniz Yuret. Locally Scaled Density Based Clustering. Adaptive and Natural Computing Algorithms: Proceedings of the Eighth International Conference (ICANNGA 2007). Springer, Lecture Notes in Computer Science (LNCS), vol. 4431, Warsaw, Poland, Apr. 11-14, 2007, pp. 739-748.*
B. Borah and D.K. Bhaftacharyya. A Clustering Technique using Density Difference. Proceedings of the International Conference on Signal Processing, Communications and Networking (ICSCN 2007), IEEE, MIT Campus, Anna University, Chennai, India, Feb. 22-24, 2007, pp. 585-588.*

* cited by examiner

*Primary Examiner* — Usmaan Saeed
*Assistant Examiner* — Brian E. Weinrich
(74) *Attorney, Agent, or Firm* — Muncy, Geissler, Olds & Lowe, PLLC (57) ABSTRACT

A density-based data clustering method executed by a computer system is disclosed. The method includes a setup step, a clustering step, an expansion step and a termination step. The setup step sets a radius and a threshold value. The clustering step defines a single cluster on a plurality of data points of a data set, and provides and adds a plurality of first boundary marks to a seed list as seeds. The expansion step expands the cluster from each seed of the seed list, and provides and adds at least one second boundary mark to the seed list as seeds. The termination step determines whether each of the data points is clustered, wherein the clustering step is re-performed if the determination is negative.

4 Claims, 6 Drawing Sheets

DENSITY-BASED DATA CLUSTERING METHOD

BACKGROUND OF THE INVENTION

1. Field of the Invention

The present invention generally relates to a data clustering method and, more particularly, to a density-based data clustering method.

2. Description of the Related Art

A conventional density-based data clustering method is performed based on the density of a plurality of data points to be clustered. For example, under a given radius R and a threshold value, an area is searched and gradually expanded if the density of the data points in the area satisfies a predetermined condition. The area is gradually expanded and merged with other areas whose density of data points satisfies the predetermined condition. In this manner, the data points can be clustered. Conventionally, the representative density-based data clustering methods include DBSCAN, IDBSCAN and FDBSCAN methods. Although the conventional methods can efficiently detect the data points with an irregular pattern and filter the noise data points, great time consumption is resulted.

The representative density-based data clustering methods are described as follows.

A. DBSCAN data clustering method. The method was proposed by M. Ester at al. in 1996. A first step of the method is to randomly select one of a plurality of data points of a data set as an initial seed. A second step of the method is to determine whether the number of the data points located in a searching range, which is expanded from the seed in the radius R, is larger than the threshold value. If so, the data points in the searching range are clustered together as a cluster and regarded as seeds. Accordingly, each seed in the searching range will undergo the same expansion operation as the initial seed did. A third step of the method is to repeatedly perform the second step until all data points in the data set are clustered. The DBSCAN method can filter the noise data points and the data points with an irregular pattern because it clusters the data points based on the density thereof. However, because it is required to repeatedly perform the same density determination step for each data point, great time consumption is resulted. Moreover, because it is also required to calculate the distances between a core point and individual data points, great time consumption is resulted.

B. IDBSCAN data clustering method. The method was proposed by B. Borah et al. in 2004, and aims at solving the problem of large time consumption of the DBSCAN data clustering method, which is caused by repeated determination and expansion operations of the seeds, by reducing the number of times of the required data inquiries. The method evenly creates 8 boundary marks on a circumference of a searching range expanded from a seed in the radius R. In the searching range, there is always a data point that is closest to a given boundary mark; therefore, 8 data points closest to the 8 boundary marks can be obtained. The method only selects the 8 data points as seeds, which reduces the quantity of the seeds when compared to the DBSCAN method. As such, the number of times the expansion operation will be executed can be reduced. Thus, the problem of large time consumption of the DBSCAN data clustering method can be overcome. However, the amount of time saved is still limited.

Furthermore, because the IDBSCAN method requires selecting 8 data points closest to the 8 boundary marks as seeds, the distance between individual closest data point and its corresponding boundary mark should be calculated. Further, before the 8 closest data points are determined, a lot of distance calculation and comparison is required, leading to a limited amount of time saved.

Moreover, although the number of the seeds in the searching range expanded from an expanded seed is not more than 8, the searching ranges expanded from two adjacent seeds may overlap in a greater extent. This results in a repeated expansion operation and increases the time consumption.

Based on the above reasons, it is desired to provide a density-based data clustering method that does not use data points as seeds, thereby reducing the number of times the expansion operation is executed and avoiding distance calculation. Thus, improved data clustering efficiency can be provided.

SUMMARY OF THE INVENTION

It is therefore the primary objective of this invention to provide a density-based data clustering method which requires a lesser number of times of the expansion operation without requiring the distance calculation, thereby providing a high data clustering efficiency.

The invention discloses a density-based data clustering method executed by a computer system. The method includes a setup step, a clustering step, an expansion step and a termination step. The setup step sets a radius and a threshold value. The clustering step defines a single cluster on a plurality of data points of a data set, and provides and adds a plurality of first boundary marks to a seed list as seeds. The expansion step expands the cluster from each seed of the seed list, and provides and adds at least one second boundary mark to the seed list as seeds. The termination step determines whether each of the data points is clustered, wherein the clustering step is re-performed if the determination is negative.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

In the various figures of the drawings, the same numerals designate the same or similar parts. Furthermore, when the term "first", "second", "third", "fourth", "inner", "outer" "top", "bottom" and similar terms are used hereinafter, it should be understood that these terms refer only to the structure shown in the drawings as it would appear to a person viewing the drawings, and are utilized only to facilitate describing the invention.

DETAILED DESCRIPTION OF THE INVENTION

Figure 1:
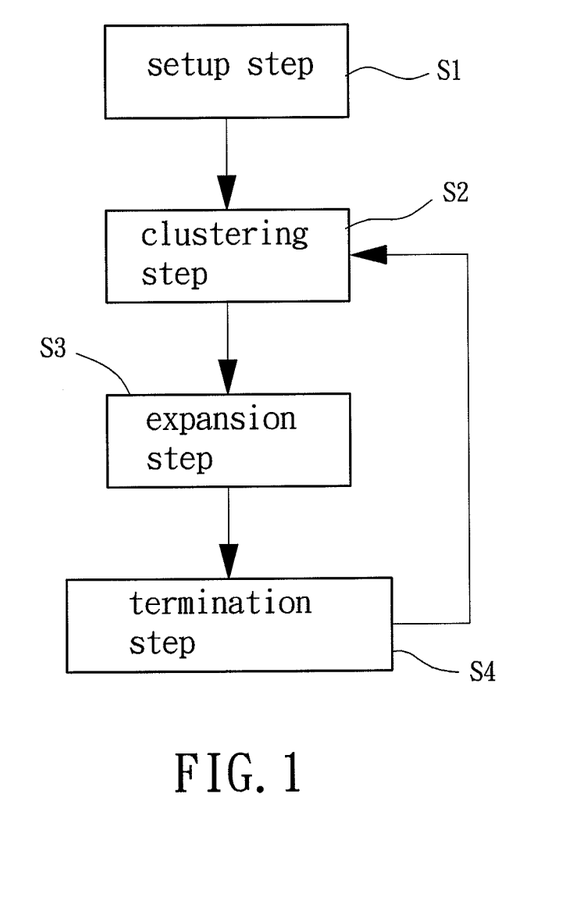
FIG. 1 shows a flowchart of a density-based data clustering method according to a preferred embodiment of the invention.
Figure 2:
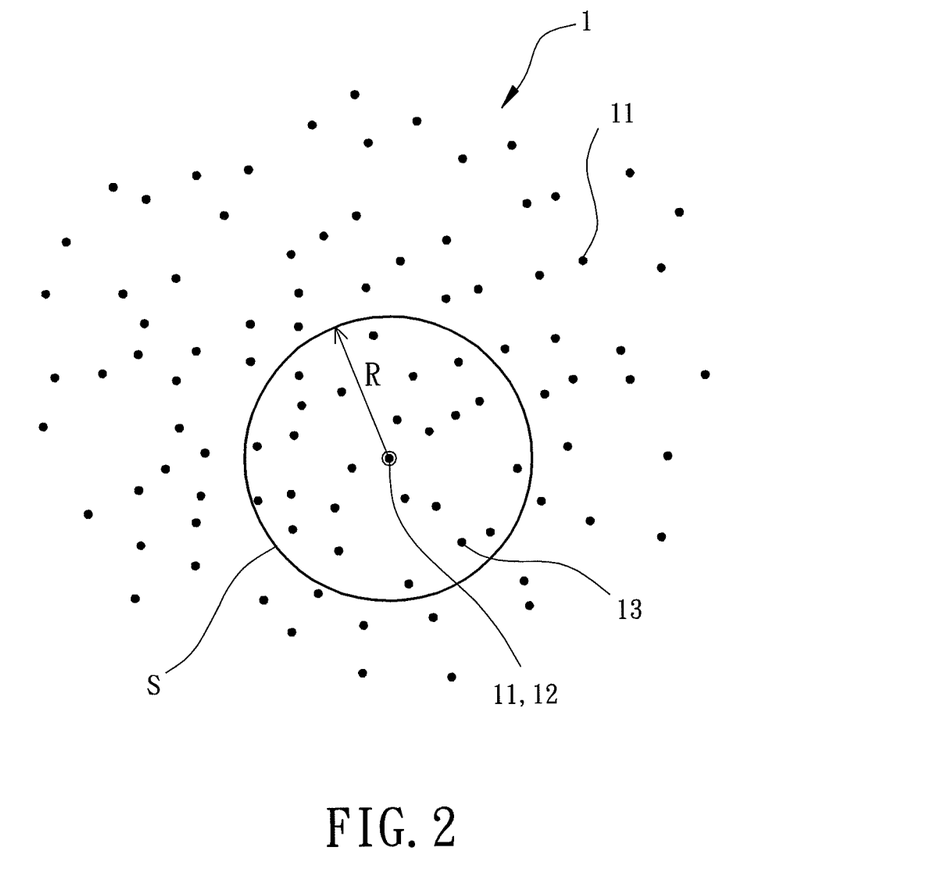
FIG. 2 shows a data set having a plurality of data points distributed in a two-dimensional space according to the preferred embodiment of the invention.

Referring to FIGS. 1 and 2, the proposed density-based data clustering method is performed by a computer system connected to at least one database having a data set 1. The data set 1 consists of a plurality of data points 11. The method comprises a setup step S1, a clustering step S2, an expansion step S3 and a termination step S4. Based on the steps S1 to S4, the invention can accurately cluster the data points 11 of the data set 1.

Referring to FIGS. 1 and 2 again, the setup step S1 is configured to set a radius R and a threshold value by the computer system. The radius R is proportional to the threshold value. Specifically, the threshold value is larger when the radius R is larger, and the threshold value is smaller when the radius R is smaller. In this manner, high clustering accuracy can be provided. Herein, a circular coverage expanded from a given data point 11 or a seed in the radius R is defined as a searching range S.

Figure 3:
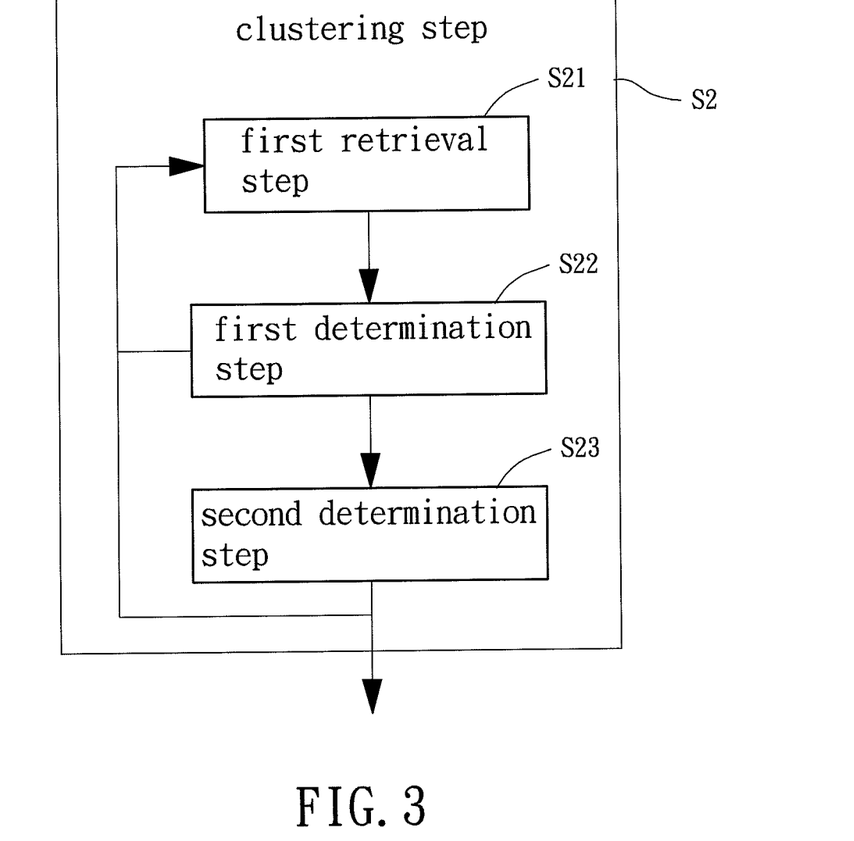
FIG. 3 shows a detailed flowchart of a clustering step of the density-based data clustering method of the invention.

Referring to FIGS. 1 and 2, the clustering step S2 is configured to define a single cluster on the data points 11 of the data set 1, to arrange a plurality of boundary marks 2, and to add the plurality of boundary marks 2 to a seed list. In this embodiment, the quantity of the boundary marks 2 is 4. Referring to FIG. 3, the clustering step S2 comprises a first retrieval step S21, a first determination step S22 and a second determination step S23.

Referring to FIGS. 2 and 3, the first retrieval step S21 is configured to retrieve one of the data points 11, and to set the retrieved data point 11 as an initial data point 12. Specifically, the first retrieval step S21 retrieves one of the data points 11 and acknowledges the retrieved data point 11 as "retrieved".

Referring to FIGS. 2 and 3 again, the first determination step S22 is configured to determine whether the initial data point 12 is clustered? If so, the procedure goes back to the first retrieval step S21. If not, the initial data point 12 is deemed as the cluster. Then, a searching range S expanded from the initial data point 12 in the radius R is defined, and the data points 11 located in the searching range S are defined as neighboring data points 13. Specifically, the distance between the initial data point 12 and each data point 11 is calculated. Those data points 11 with distances to the initial data point 12 that are shorter than or equal to the radius R are defined as the neighboring data points 13.

Figure 4:
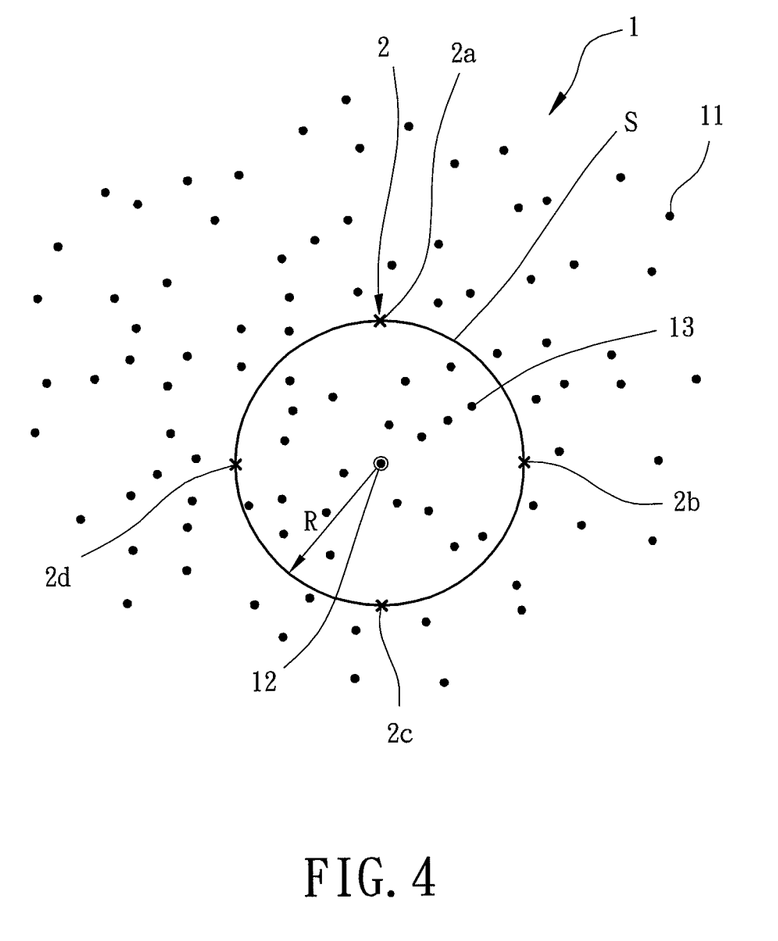
FIG. 4 shows the data set having a plurality of seeds according to the preferred embodiment of the invention.

Referring to FIGS. 3 and 4, the second determination step S23 is configured to determine whether the number of the neighboring data points 13 is larger than or equal to the threshold value. If so, the neighboring data points 13 and the initial data point 12 are clustered together as the cluster, and the plurality of boundary marks 2 on the boundary of the searching range S is added to the seed list as seeds. If the number of the neighboring data points 13 is smaller than the threshold value, the initial data point 12 is regarded as a noise data point, and the procedure goes back to the first retrieval step S21. For instance, in the embodiment, four boundary marks 2a, 2b, 2c and 2d are evenly arranged on the boundary of the searching range S in a clockwise manner and added to the seed list. Assume that the coordinate of the initial data point 12 is (0,0), then the coordinates of the boundary marks 2a, 2b, 2c and 2d are (0,R), (R,0), (0,-R) and (-R,0), respectively. In this arrangement, only the boundary marks 2a, 2b, 2c and 2d require an expansion operation. In contrast to the conventional IDBSCAN data clustering method which performs the expansion operation on 8 boundary marks, the invention reduces the number of times the expansion operation will be executed as only four boundary marks 2a, 2b, 2c and 2d require the expansion operation. In addition, since the boundary marks 2 are directly added to the seed list, it does not require calculations of the distances between individual boundary mark 2 and each neighboring data point 13 nor does it require determination of the closest neighboring data point 13. Thus, time consumption resulting from distance calculation can be avoided when compared to the conventional data clustering method.

Figure 5:
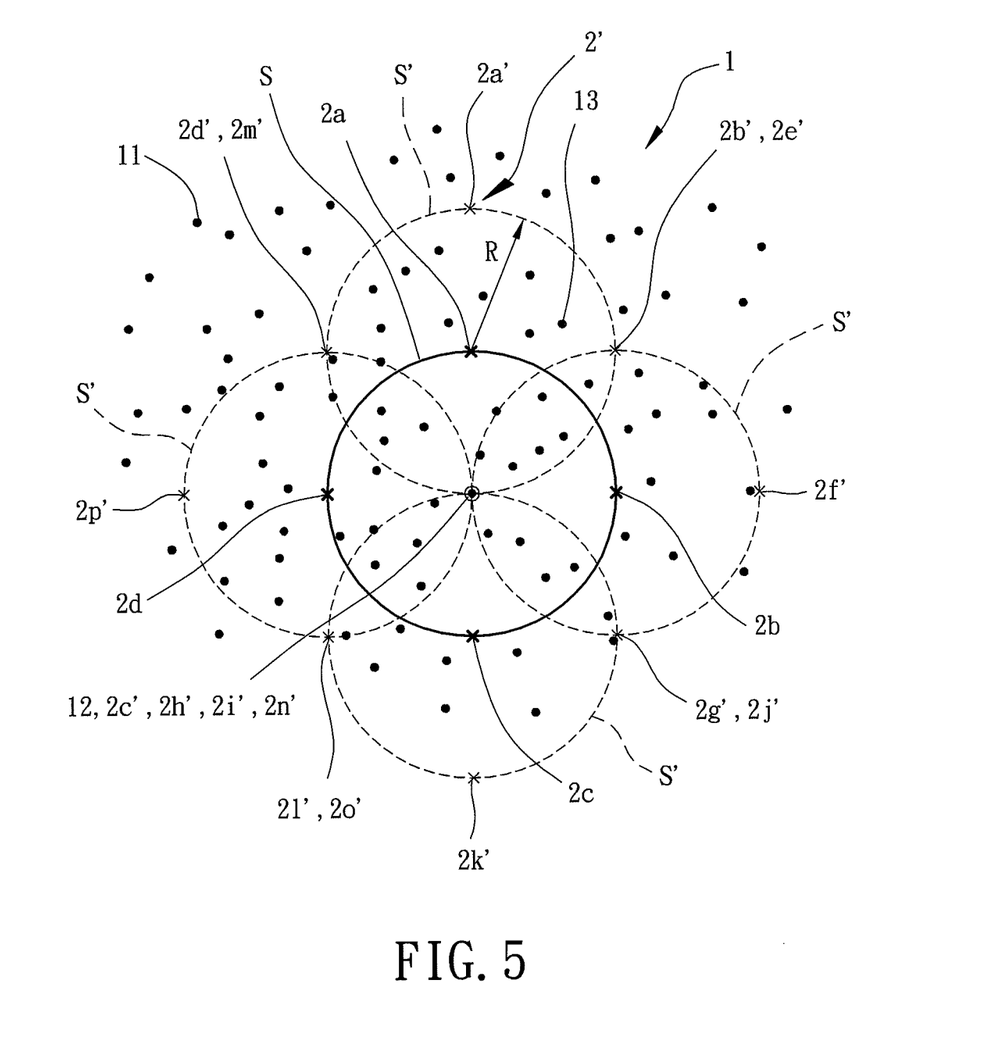
FIG. 5 shows the data set having the plurality of seeds undergoing an expansion operation according to the preferred embodiment of the invention.
Figure 6:
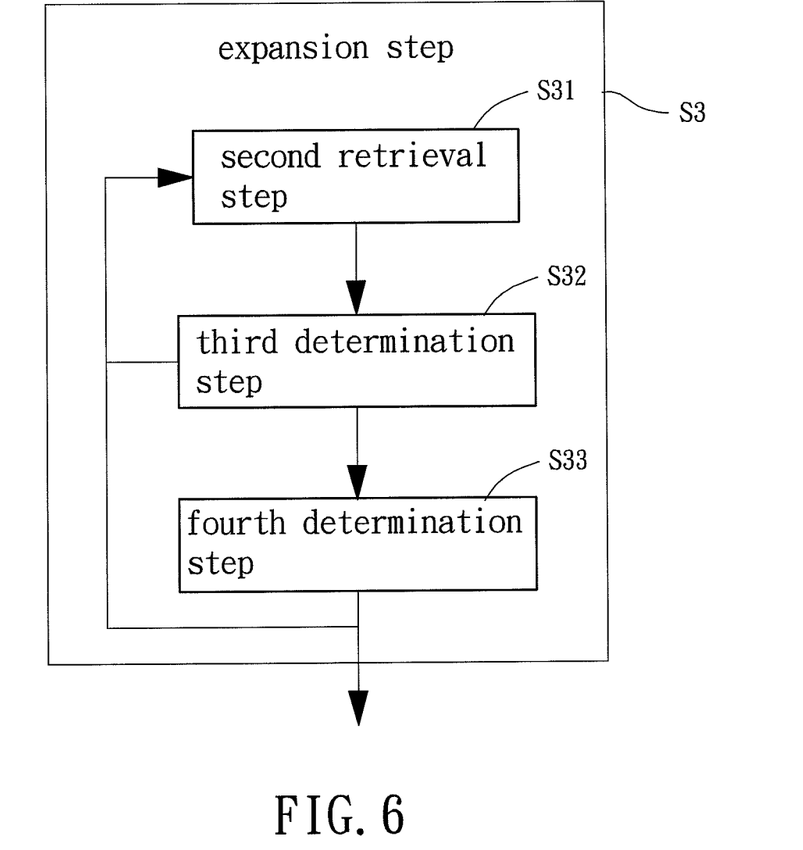
FIG. 6 shows a detailed flowchart of an expansion step of the density-based data clustering method of the invention.

Referring to FIGS. 1 and 5, the expansion step S3 is configured to perform the expansion operation on each seed in the seed list, to arrange at least one boundary mark 2', and to add the at least one boundary mark 2' to the seed list. Referring to FIG. 6, the expansion step S3 comprises a second retrieval step S31, a third determination step S32 and a fourth determination step S33.

Referring to FIGS. 5 and 6, the second retrieval step S31 is configured to retrieve one seed in the seed list in order, to define a searching range S' for the retrieved seed based on the radius R, and to set all data points 11 located in the searching range S' as neighboring data points 13. Specifically, the second retrieval step S31 acknowledges the retrieved seed as "retrieved", calculates the distance between the seed and each data point 11, and defines those data points 11 with distances to the seed shorter than or equal to the radius R as the neighboring data points 13.

As an example, referring to FIG. 5, the boundary marks 2a, 2b, 2c and 2d are set as seeds of the seed list. Then, a searching range S' for the boundary mark 2a is defined. In other words, the center of the searching range S' is located at the boundary mark 2a, and the data points 11 located in the searching range S' are set as new neighboring data points 13. Similarly, the searching ranges S' for the boundary marks 2b, 2c and 2d are accordingly defined when the second retrieval step S31 is performed later again.

Referring to FIGS. 5 and 6 again, the third determination step S32 is configured to determine whether the number of the neighboring data points 13 in the searching range S' is larger than or equal to the threshold value. If so, the neighboring data points 13 and the initial data point 12 are clustered together, and the at least one boundary mark 2' is added to the seed list. If the number of the neighboring data points 13 in the searching range S' is smaller than the threshold value, the second retrieval step S31 is re-performed. Since the center of the searching range S' is located on the boundary of the searching range S, the neighboring data points 13 in the searching range S' will include the data points 11 that are not clustered as well as the data points 11 that are regarded as noise data points. Specifically, if the number of the neighboring data points 13 in the searching range S' is larger than or equal to the threshold value, the neighboring data points 13 and the initial data point 12 are set as being in the same cluster. This allows the cluster to further expand. In the embodiment, four boundary marks 2' are evenly arranged on the boundary of the searching range S' in a clockwise manner. Because the center of the searching range S' may fall on one of the four boundary marks 2 (i.e. 2a, 2b, 2c or 2d), the boundary marks 2' and 2 may overlap with each other (i.e. a portion of the boundary marks 2' may overlap a portion of the boundary marks 2). Therefore, some of the data points 11 that have already been processed will be processed again if all the four boundary marks 2' are added to the seed list, resulting in a waste of time. In light of this, only the boundary marks 2' that were not added to the seed list need to be added to the seed list.

As an example, referring to FIG. 5, the center of the searching range S' is located at the boundary mark 2a, and the boundary mark 2c' of the searching range S' is located at the initial data point 12. In this case, the data points 11 in the searching range S of the initial data point 12 were processed. Therefore, it is only required to add 3 out of the four boundary marks 2a', 2b', 2c' and 2d', namely—the boundary marks 2a', 2b' and 2d', to the seed list. This avoids the data points 11 in the searching range S of the initial data point 12 from being processed again, preventing unnecessary data operations. As for the searching range S' whose center is located at the boundary mark 2b, it is only required to add 2 out of the four boundary marks 2e', 2f', 2g' and 2h', namely—the boundary marks 2f' and 2g', to the seed list. As for the searching range S' whose center is located at the boundary mark 2c, it is only required to add 2 out of the four boundary marks 2i', 2j', 2k' and 2l', namely—the boundary marks 2k' and 2l', to the seed list. As for the searching range S' whose center is located at the boundary mark 2d, it is only required to add 1 out of the four boundary marks 2m', 2n', 2o' and 2p', namely—the boundary mark 2p', to the seed list. In this manner, one skilled in the art may readily appreciate that one or more boundary marks will be added to the seed list each time the expansion operation is performed on individual boundary marks 2a', 2b', 2d', 2f, 2g', 2k', 2l' and 2p' to expand the cluster later.

Referring to FIG. 6 again, the fourth determination step S33 is configured to determine whether there are any seeds in the seed list that are not yet retrieved? If so, the procedure goes back to the second retrieval step S31. If not, the clustering of the single cluster is finished, and the procedure proceeds to the termination step S4. Specifically, every seed in the seed list will be acknowledged as "retrieved" once it finishes the second retrieval step S31 of the expansion step S3. However, during the performance of the third determination step S32 of the expansion step S3, boundary marks are constantly added to the seed list as seeds. Therefore, new seeds are constantly added to the seed list while old seeds are constantly deleted from the seed list during the performance of the third determination step S32 of the expansion step S3. When there are any seeds in the seed list that are not yet retrieved, it is determined whether the cluster is to be further expanded or not based on the un-retrieved seed or seeds. If all seeds in the seed list are retrieved, the clustering of the cluster is finished.

Referring to FIGS. 1 and 2, the termination step S4 is configured to determine whether all data points 11 are clustered? If so, the proposed data clustering method is terminated. If not, the clustering step S2 is re-performed. Specifically, once the clustering operation of a single cluster is finished, it is determined whether all data points 11 are clustered? If so, the clustering operation of the data set 1 is finished. If not, the first retrieval step S21 of the clustering step S2 is re-performed to cluster the un-clustered data points 11 as another cluster or clusters.

To prove the proposed method as being faster and more accurate than the conventional data clustering methods in data clustering, as well as being more efficient than the conventional data clustering methods in filtering the noise data points, data sets A to F are provided for experimental purpose. The experimental results of the data sets A to F using the proposed method are compared to those of the data sets A to F using the conventional DBSCAN and IDBSCAN data clustering methods. The data set A comprises 10 clusters, the data set B comprises 5 clusters, the data set C comprises 4 clusters, the data set D comprises 4 clusters, the data set E comprises 2 clusters, and the data set F comprises 4 clusters. The data sets A to F have different patterns from each other. Each of the data sets A to F has 115,000 data points, including 15,000 noise data points.

Table 1 below shows the radius R and the threshold value set in the setup step S1.

TABLE 1

| | Experimental Parameters of The Invention | | | | | |
|---|---|---|---|---|---|---|
| Parameter | Data Set A | Data Set B | Data Set C | Data Set D | Data Set E | Data Set F |
| Radius R | 5 | 10 | 7 | 10 | 8 | 9 |
| Threshold Value | 45 | 100 | 70 | 100 | 80 | 120 |

The experimental equipment includes a Central Processing Unit (CPU) of 3.4 GHz (Intel Pentium D) and a memory of 2 GB, with the computer program implemented by Java algorithm and executed under the operation system of Windows 7. Table 2 shows the experimental results of the data sets A to F obtained by the proposed method and the conventional data clustering methods.

TABLE 2

| | | Experimental Results | | | | | |
|---|---|---|---|---|---|---|---|
| Algorithm | Test Item | Data Set A | Data Set B | Data Set C | Data Set D | Data Set E | Data Set F |
| DBSCAN | TC | 256.06 | 258.44 | 253.98 | 254.70 | 250.26 | 253.28 |
| | CCR | 100.0% | 100.0% | 99.98% | 100% | 99.87% | 99.88% |
| | NFR | 95.22% | 93.55% | 95.07% | 88.77% | 96.91% | 96.04% |
| IDBSCAN | TC | 177.69 | 179.24 | 177.99 | 175.29 | 183.41 | 165.83 |
| | CCR | 100.0% | 100.0% | 99.98% | 100.0% | 99.88% | 99.86% |
| | NFR | 95.21% | 93.65% | 95.11% | 88.78% | 96.92% | 96.15% |
| The Invention | TC | 34.10 | 33.74 | 37.49 | 32.53 | 46.88 | 39.02 |
| | CCR | 100.0% | 99.67% | 99.71% | 99.80% | 98.24% | 98.01% |
| | NFR | 96.14% | 97.16% | 97.27% | 93.43% | 98.93% | 98.31% |

TC(Sec): Time Consumption
CCR(%): Clustering Correctness Rate
NFR(%): Noise Filtering Rate Referring to FIG. 2 again, the comparison results between the proposed method and the conventional methods show that the proposed method can provide an improved clustering accuracy and noise filtering rate over the conventional data clustering methods while significantly reducing the time consumption. Therefore, it is verified that the invention is capable of providing a desired clustering effect for any data sets having a number of data areas with different densities.

In the proposed data clustering method, only four boundary marks 2 are arranged and added to the seed list in the second determination step S23, and one or more boundary marks 2' are arranged and added to the seed list in the third determination step S32. Thus, the quantity of the seeds of the invention is much less than that of the seeds of the conventional data clustering methods, thereby reducing the number of times the expansion operation is executed. As such, time consumption resulting from subsequent seed retrieval and related determination steps of the expansion step S3 can be reduced.

In the proposed data clustering method, the boundary marks 2 and 2' are directly added to the seed list without calculating the distance between individual boundary mark 2, 2' and each neighboring data point 13. In addition, it is also not required to determine the closest neighboring data point 13. Therefore, in contrast to the conventional data clustering methods, the proposed method avoids spending time on distance calculation, thereby reducing the overall time consumption.

In addition, because the number of times the expansion operation is executed is reduced and the distance calculation is not required in the invention, the proposed data clustering method can reduce the overall time consumption and improve the data clustering efficiency.

Although the invention has been described in detail with reference to its presently preferable embodiment, it will be understood by one of ordinary skill in the art that various modifications can be made without departing from the spirit and the scope of the invention, as set forth in the appended claims.

What is claimed is:

1. A density-based data clustering method executed by a computer system, comprising:

a setup step setting a radius and a threshold value;

a clustering step defining a single cluster on a plurality of data points of a data set, and providing and adding a plurality of first boundary marks to a seed list as seeds;

an expansion step expanding the cluster from each seed of the seed list, and providing and adding at least one second boundary mark to the seed list as seeds; and a termination step determining whether each of the data points is clustered, wherein the clustering step is re-performed if the determination is negative, wherein the expansion step comprises:

a first retrieval step retrieving one of the seeds in the seed list, defining another searching range for the retrieved seed based on the radius, and setting the data points located in the searching range of the retrieved seed as neighboring data points;

a first determination step determining whether a number of the neighboring data points in the searching range of the retrieved seed is larger than or equal to the threshold value, wherein the neighboring data points in the searching range of the retrieved seed and the initial data point are clustered together as the cluster, and the at least one second boundary mark is added to the seed list if the determination of the third determination step is positive, and the first retrieval step is re-performed if the determination of the third determination step is negative; and a second determination step determining whether each seed in the seed list is retrieved, wherein the first retrieval step is re-performed if the determination of the fourth determination step is negative.

2. The density-based data clustering method executed by a computer system as claimed in claim 1, wherein the quantity of the plurality of first boundary marks is 4.

3. The density-based data clustering method executed by a computer system as claimed in claim 1, wherein the clustering step comprises:

a second retrieval step retrieving one of the data points and setting the retrieved data point as an initial data point;

a third determination step determining whether the initial data point is clustered, wherein the second retrieval step is re-performed if the initial data point is clustered, and wherein the initial data point is deemed as the cluster, a searching range is defined to expand from the initial data point in the radius, and the data points located in the searching range of the initial data point are defined as neighboring points if the initial data point is not clustered; and a fourth determination step determining whether the quantity of the neighboring data points is larger than or equal to the threshold value, wherein the neighboring data points and the initial data point are clustered together as the cluster, and the plurality of first boundary marks is arranged on a boundary of the searching range of the initial data point and added to the seed list as seeds if the determination of the second determination step is positive, and the second retrieval step is re-performed if the determination of the second determination step is negative.

4. The density-based data clustering method executed by a computer system as claimed in claim 3, wherein the plurality of first boundary marks is arranged on the boundary of the searching range of the initial data point in an even distance.

* * * * *